W. Scarlett,
Skate.
No. 1,075. Reissued Nov. 13, 1860.
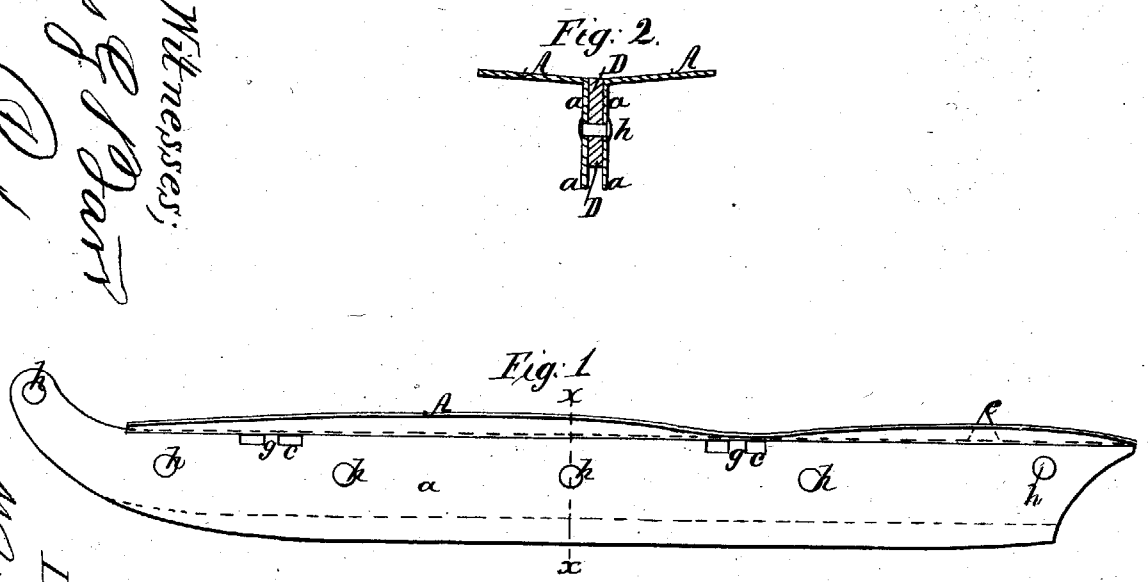
Witnesses;
James G. Parr
Samuel Parker
Inventor;
William Scarlett
AM. PHOTO-LITHO. CO. N.Y. (OSBORNE'S PROCESS.)

UNITED STATES PATENT OFFICE.

WILLIAM SCARLETT, OF AURORA, ILLINOIS.

IMPROVEMENT IN SKATES.

Specification forming part of Letters Patent No. 28,506, dated May 29, 1830; Reissue No. 1,075, dated November 13, 1860.

*To all whom it may concern:*

Be it known that I, WILLIAM SCARLETT, of Aurora, in the county of Kane and State of Illinois, have invented a new and useful Improvement in the Manufacture of Skates; and I do hereby declare that the following is a full, clear, and exact description thereof, reference being had to the accompanying drawings, forming a part of this specification, in which—

Figure 1 is a side view. Fig. 2 is a transverse section taken through Fig. 1 on the line *x x*, showing the manner in which the parts of the skate are bent and put together.

To enable others skilled in the art to fully understand and construct my invention, I will proceed to describe its construction and operation by the aid of the drawings.

A *a* A *a* represent pieces of sheet-steel, which have been cut by dies or otherwise in the proper shape to form each one-half of the foot-stand and runner. These flat pieces are then bent so that the runner portion *a* will be at right angles, or nearly so, to the stand portion A, as shown in Fig. 2. In the stamping out of these pieces slots *c c* are made at suitable points, and the bend is made just above these slots. These slots serve for receiving the straps for securing the skate to the foot. When the plates A (one right and the other left) are thus prepared, they are brought together, and a stiff piece, D, of thicker metal, which has previously been cut into the required shape, is interposed between the two vertical or runner portions *a* of the plates, and the whole skate is secured together by a suitable number of rivets, *h h h*, as shown by the drawings. The heel-spur *e* and pins *g g* are formed on the interposed plate D. These pins *g g* project up through the slots *c c*, and serve to retain the strap in place, which is quite important to prevent the skates from slipping laterally while strapped to the feet. When the parts of the skate are thus secured together, the skate may be fitted and finished up ready for the market with very little trouble.

Sheet-iron may be used in lieu of steel in this manufacture, and the stiffening-bar D may also be dispensed with, if preferred, bringing the two sides *a a* into contact.

My improved skate is lighter than any of equal strength before known to me. It is very attractive in appearance, and is easier to the foot in consequence of its being elastic, so that it yields slightly to the strain of the foot, and to the tension of the strap. A feature of equal or greater importance is the cheapness with which it may be produced. The small cost and uniform character of sheet-iron and the perfection to which the cutting, punching, and bending it by machinery have advanced enable this manufacture to be conducted at a cost so far less than any other skate as to be hardly capable of comparison.

I do not claim the making of the foot-piece and runners in two halves of cast metal united to each other by rivets. Nor do I claim the application of a movable bearer within the groove of the skates, as in Joseph's patent, 1859; but,

Having thus fully described my invention, what I claim as new in the manufacture of skates, and desire to secure by Letters Patent, is—

1. A skate composed of two sheet-metal parts, A *a* A *a*, cut and bent into the proper form and applied together, as herein shown.

2. The employment of the central stiffening-bar, D, in skates of the character above described, for the purpose herein set forth.

In testimony whereof I have hereunto set my hand in the presence of two subscribing witnesses.

WILLIAM SCARLETT.

Witnesses:

JAMES BARR,

SAML. PARKER.